• US005545854A

United States Patent [19]
Ishida

[11] Patent Number: 5,545,854
[45] Date of Patent: Aug. 13, 1996

[54] GROMMET FOR WIRE SEALING

[75] Inventor: Hidehito Ishida, Northville, Mich.

[73] Assignee: Yazaki Corporation, Japan

[21] Appl. No.: 174,835

[22] Filed: Dec. 29, 1993

[51] Int. Cl.[6] .................................................. H01B 17/26
[52] U.S. Cl. ................... 174/153 G; 174/65 G; 174/156; 16/2; 248/56; 285/162
[58] Field of Search .......................... 174/153 G, 153 R, 174/65 R, 65 G, 152 G, 151, 155, 156, 157, 65 SS; 16/2; 248/56; 285/162, 196, 194, 338

[56] References Cited

U.S. PATENT DOCUMENTS

| | | | |
|---|---|---|---|
| 2,186,277 | 1/1940 | Tetens | 174/152 G X |
| 2,431,154 | 11/1947 | Wikstrom | 174/65 SS |
| 3,564,113 | 2/1971 | Kindler | 174/659 |
| 3,649,054 | 3/1972 | McClenan | 174/65 SS |
| 3,836,269 | 9/1974 | Koscik | 403/197 |
| 4,912,287 | 3/1990 | Ono et al. | 174/153 G |

FOREIGN PATENT DOCUMENTS

| | | |
|---|---|---|
| 50-110798 | 2/1974 | Japan . |
| 61-153232 | 3/1985 | Japan . |
| 64-45420 | 9/1987 | Japan . |

*Primary Examiner*—Hyung S. Sough
*Attorney, Agent, or Firm*—Young & Basile, P.C.

[57] ABSTRACT

A novel grommet assembly for securely sealing a wire harness or cable to an automotive panel opening is achieved with separate, identical grommet halves whose components are axially assembled. The assembled grommet halves are radially mated over the cable and lockingly inserted into the dash panel opening to provide an airtight seal between the cable and the opening. The grommet assembly includes rigid inner and outer shell portions which are axially locked to sandwich a resilient seal therebetween. The seal essentially fills the space between the inner and outer shells, and is both axially and radially compressed upon assembly of the grommet halves, and further when the grommet halves are mated over the cable. The compressive forces on the seal ensure a secure, airtight sealing interface with the cable, between the components of the grommet assembly, and with the dash panel.

12 Claims, 5 Drawing Sheets

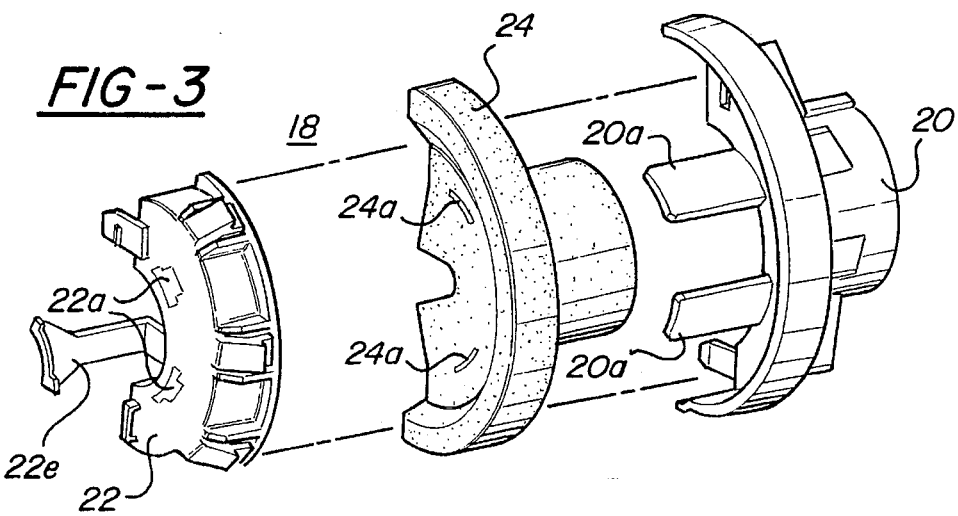
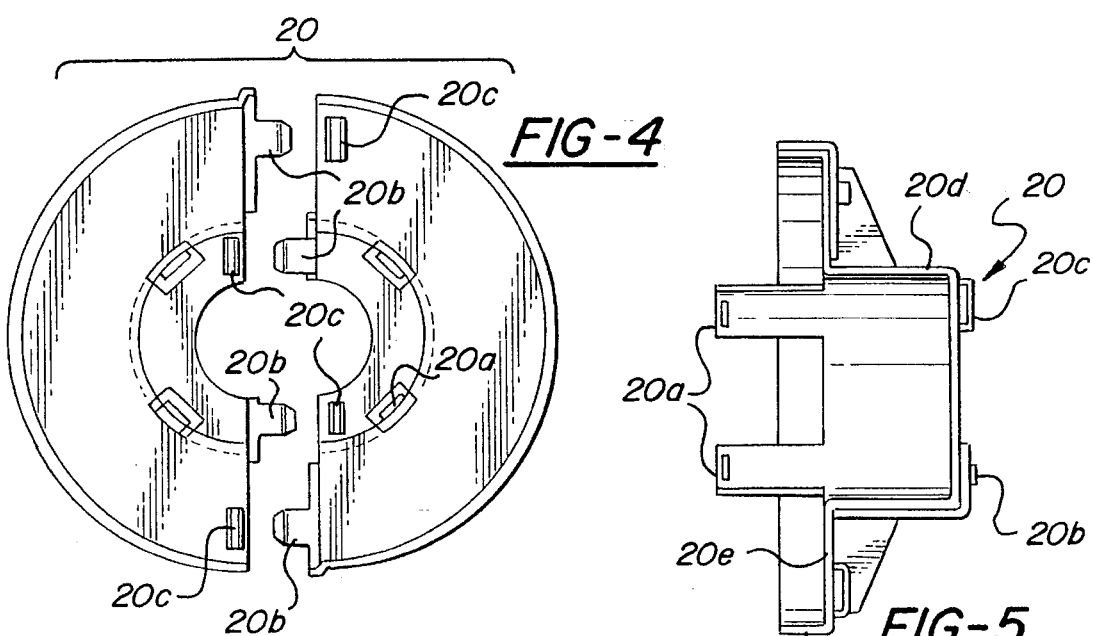
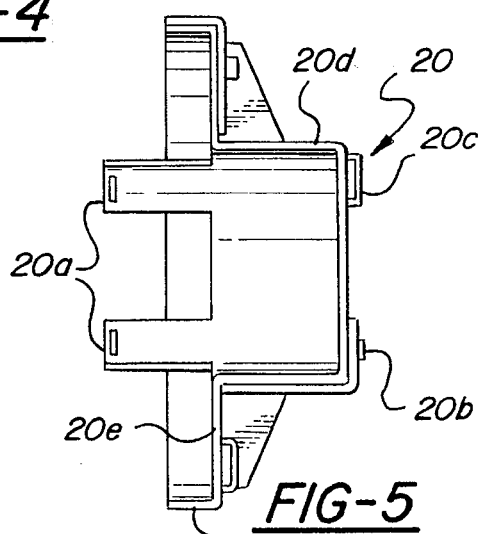
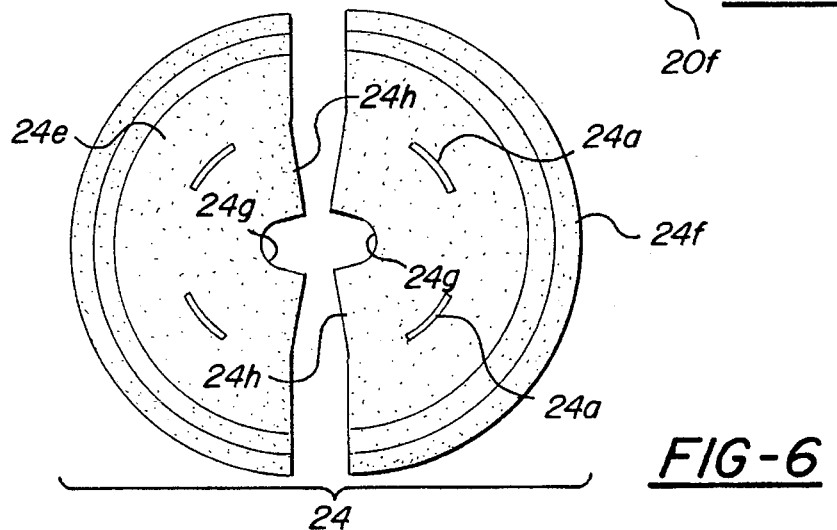

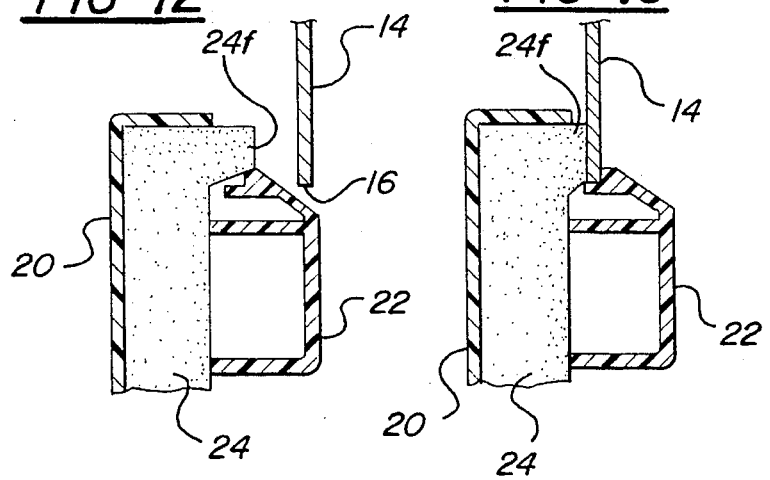
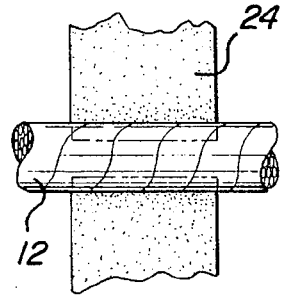
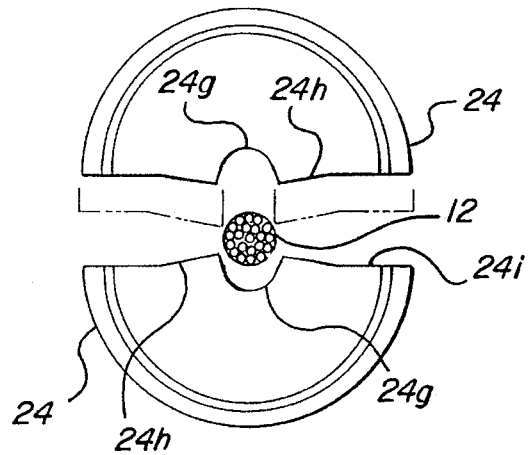
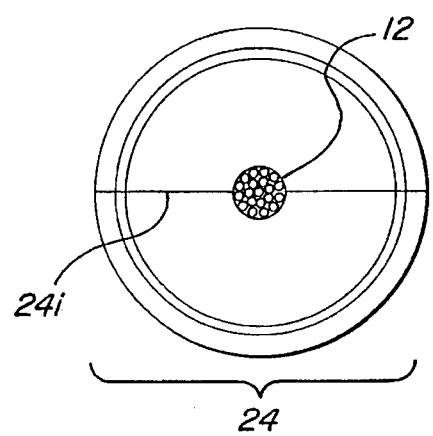
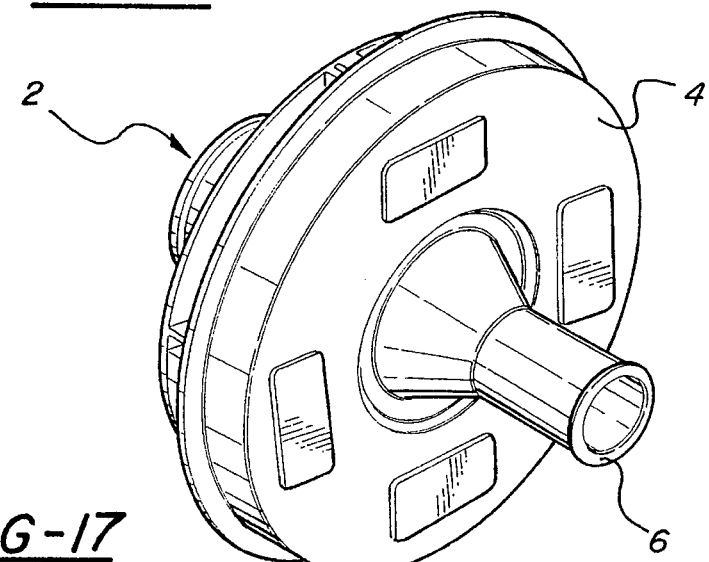

GROMMET FOR WIRE SEALING

FIELD OF THE INVENTION

The present invention is related to grommet-type seal assemblies for sealingly fitting a cable or wire harness to an opening in a panel.

BACKGROUND OF THE INVENTION

Wire harnesses or cables which pass through panel openings, for example from the engine compartment of an automobile through the dash panel or fire wall to the passenger compartment, often require a tight seal between the panel and cable to prevent leakage of water and/or fumes between compartments separated by the panel. It is frequently desirable that the seal also provide support for the cable relative to the panel and hole through which it passes, to protect it from abrasion. Finally, the seal should effect a secure and easily-established connection to both the cable or wire harness and the panel.

Several attempts have been made in the prior art to provide a seal assembly which meets the above requirements for automotive panel applications. A first prior art device is a one-piece, all-rubber grommet with an elastic, cylindrical stem which must be forcibly stretched open to axially insert the cable through the grommet. When relaxed the relatively long stem seals tightly against the cable. The body of this one-piece rubber grommet has a peripheral slot or groove for mating it to suitable connecting structure around an opening in a dash panel after the grommet has been fastened to the cable. The stretching operation and installation of the grommet onto the panel both require substantial effort.

A second prior art device combines a rigid support with the rubber grommet seal for an improved snap-fit to the dash panel opening with beveled locking tabs. This device, however, still requires the undesirable stretching operation to axially apply the rubber grommet seal to the wire cable.

U.S. Pat. No. 3,836,269 to Koscik attempts to solve the problems inherent in axial assembly of the grommet to the cable by splitting a grommet assembly into two halves which are hinged to one another. These two hinged halves can accordingly be assembled radially over the cable, rather than axially. The assembled grommet and cable are then inserted into the hole in the dash panel in sealing fashion.

While the Koscik device improves the ease of fastening the grommet around the cable, the seal between the grommet assembly and the cable is significantly less effective and reliable than the seal provided by the rubber, axially-assembled grommets described above. The axial rubber grommets provide a relatively long, elastic stem which, once stretched over the cable and released, provide a large sealing surface relative to the cable. The natural radial tension of the undersize cylindrical stem further improves the effectiveness of the seal with the cable. In the Koscik device, however, the hinged halves and their flanged cable-engaging openings, which form a tubular cable path for the grommet when the halves are folded together, are made from a rigid, non-sealing plastic. For a seal between the grommet assembly and the cable, Koscik relies on an O-ring type gasket, also hinged, with interior cable-sealing ring portions. This hinged gasket is secured to the rigid halves of the grommet assembly with adhesive.

This small, hinged O-ring gasket provides a relatively weak and unreliable seal with the cable, first because any irregularity in the cable cross-section at the interface of the O-ring prevents a seal from being formed, and second because the effective axial length of the sealing surface is small. Additionally, the seal between the edges of the hinged O-ring gasket, when folded together, is not particularly strong.

SUMMARY OF THE INVENTION

The present invention resides in a novel grommet assembly which does not require any undesirable stretching operation to attach the grommet to the cable or wire harness, and which solves the weak seal problems of the prior art. In general this is accomplished with a grommet assembly comprising two separate, diametrically-mating grommet halves, each half of the assembly including a compressible resilient seal half and two substantially rigid shell portions. The seal and the shell portions of each half are axially assembled, with the seal sandwiched between the shells such that it is both axially and radially compressed by the shell portions in the assembled condition to enhance the sealing effect therebetween. The compression of the seal is increased when the assembled grommet halves are themselves mated over the cable.

The shell portions of the grommet assembly are made from an essentially rigid plastic or similar material, with mechanical locking structure for connecting the shells to each other and for connecting the assembled grommet to the dash panel.

The resilient seal halves provide large sealing surfaces at their interface with the shell portions, the cable and the dash panel, and essentially fill the space between the shell portions. A suitable material is a foamed rubber. Each seal half has an elongated groove opening onto a face which abuts the other seal half when the grommet halves are assembled. When assembled, the two grooves define a long, essentially tubular sealing channel which tightly engages the cable along a substantial portion of its length.

The grommet of the present invention achieves an improved assembly of the grommet halves over the cable, and of the shell and seal components of each half. Each grommet half comprises three portions, two shell portions and the resilient seal, which are axially assembled in a simple and precise manner. The completed grommet half is then diametrically (radially) assembled to its mate over the cable.

The resilient seal halves are contoured adjacent the groove at their mating faces to increase their radial compression and sealing fit when diametrically assembled to one another. Accordingly, while each seal half is axially and radially compressed when axially sandwiched between the shell portions, assembly of two grommet halves into a whole increases the radial compression for a better seal with the cable and shell portions.

A further feature of the invention is the non-circular profile of the cable sealing channel. The size and shape of the grooves and sealing channel promote a tight fit even with cables which are not perfectly round or which are undersized.

These and other features of the invention will be apparent upon further reading of the specification.

BRIEF DESCRIPTION OF THE DRAWINGS

FIG. 3 is an exploded perspective view of one half of the grommet assembly of FIG. 2;

FIG. 4 is a plan view of the outer shell portions of the grommet assembly of FIG. 1;

FIG. 5 is a side view of an outer shell portion from FIG. 4;

FIG. 6 is a plan view of the seal halves of FIG. 1;

FIGS. 12 and 13 are side section views of the panel attachment and sealing portions of the grommet assembly of FIG. 1;

FIG. 14 is a side section view of the cable sealing interface of the grommet assembly of FIG. 1;

FIGS. 15 and 16 are plan views of the seal halves and their engagement with the cable; and FIG. 17 is a perspective view of a unitary prior art grommet assembly which must be stretched open before being axially assembled to a cable.

DETAILED DESCRIPTION OF THE DRAWINGS

Figure 1:
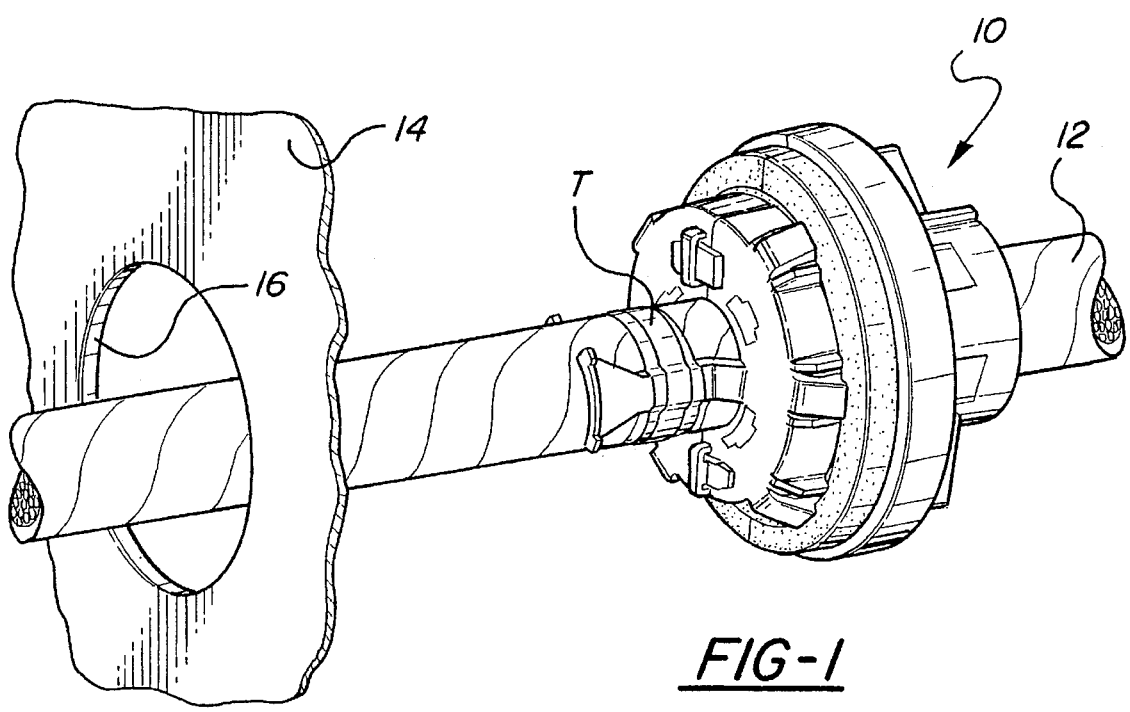
FIG. 1 is a perspective view of a grommet assembly according to the present invention, attached to a cable for sealing insertion into an opening in an automotive dash panel.

Referring first to FIG. 1, a grommet assembly 10 according to the present invention is shown assembled on a wire harness or cable 12 passing through opening 16 in an automotive dash panel 14. Once sealingly attached to cable 12 as shown in FIG. 1, grommet assembly 10 is axially inserted in opening 16 to seal the opening and prevent leakage of water and/or fumes between the compartments separated by panel 14. Grommet assembly 10 further provides a secure support for cable 12 in opening 16, fixing cable 12 relative to the panel and preventing wear between the cable and the edges of the opening. As described in further detail below, grommet assembly 10 provides a sealing interface with both cable 12 and panel 14, and a mechanical locking connection with opening 16 for a secure, tightly sealed installation.

Figure 2:
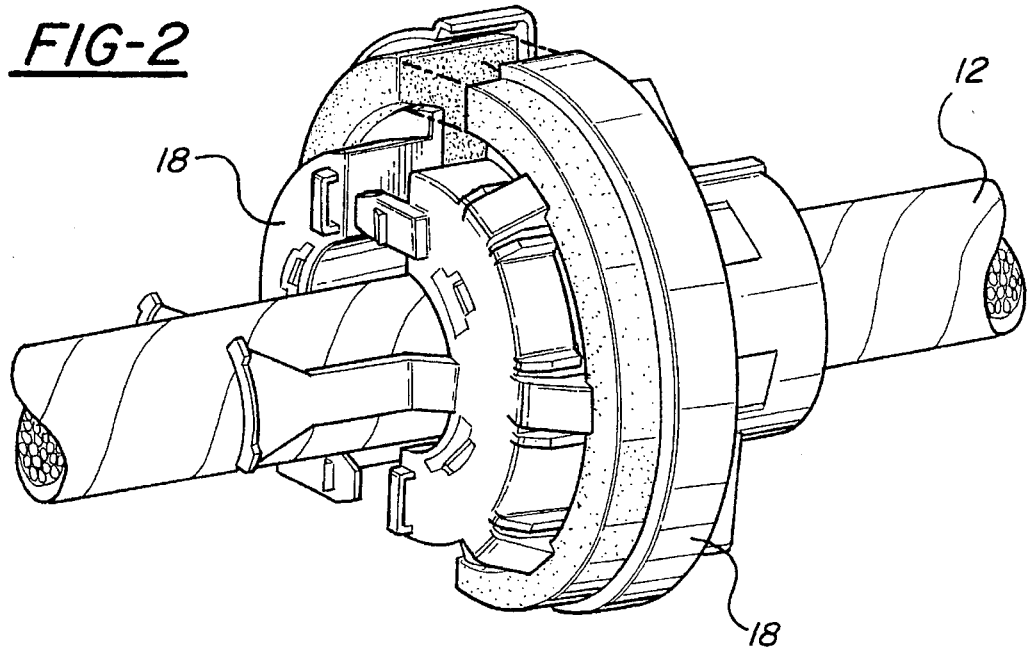
FIG. 2 is a perspective view of the two separated halves of the grommet assembly of FIG. 1, positioned prior to their diametric assembly over the cable.

In FIG. 2 grommet assembly 10 is shown comprising two separate, identical halves 18 which are diametrically mated over cable 12 to form the completed assembly 10 of FIG. 1. The separate, diametrically-mated halves 18 provide unparalleled ease of assembly over cable 12. Once mated, halves 18 form a unitary, solid whole assembly 10 which forms a tight seal with cable 12. In constrast, prior art devices such as unitary grommet assembly 2 in FIG. 17 use a soft, rubber-like seal 4 with elastic stem 6 which must be stretched open with considerable force to slide the grommet axially over the cable.

The identical nature of halves 18 prevents mismatching of parts, and only requires tooling for the manufacture of one half in order to produce assembly 10.

Although in the illustrated embodiment the grommet assembly 10 provides a substantially airtight seal with cable 12 and dash panel 14, in some applications it may only be necessary to provide a watertight seal or a soundproof seal. This will of course depend on the intended use, and it will be apparent to those skilled in the art that the present invention lends itself equally well to such uses.

In FIG. 3, one of the halves 18 is shown in an exploded perspective view comprising three axially-assembled components: an outer shell portion 20, an inner shell portion 22, and an intermediate seal half 24 sandwiched in between. Outer and inner shells 20,22 can be formed from any of a number of substantially rigid plastics and can be molded in known manner. Seal half 24 is made from a resilient sealing material such as a foam rubber. Other suitable materials for seal 24 will be apparent to those skilled in the art.

Outer and inner shells 20,22 and seal half 24 are axially assembled in the following manner. Axial assembly tabs 20a on outer shell 20 are inserted through slits 24a in seal half 24 and the two portions are pressed together until seal half 24 mates flush with the inner surfaces of outer shell 20. Axial assembly tabs 20a are longer than slits 24a, and in the assembled condition project outwardly from the slits. Assembly tabs 20a also positively align seal half 24 for assembly with outer shell 20. The radial dimensions of seal half 24 are at least slightly greater than the interior radial dimensions of outer shell portion 20, such that seal half 24 is under an initial radial compression when assembled to outer shell portion 20.

Inner shell 22 is next fitted to the two previously assembled portions 20,24 by inserting the projecting portions of tabs 20a into sockets 22a, which contain releasable locking structure (FIG. 8) to mechanically lock shell 22 to tabs 20a and outer shell 20 with seal 24 compressed therebetween. The axial dimensions of seal half 24 are at least slightly greater than the axial dimensions of the volume defined between outer shell 20 and inner shell 22, such that assembly of 20,22 places seal half 24 under axial compression.

The dimensions of seal half 24 are accordingly such that it is placed under both radial and axial compression when assembled between outer shell 20 and inner shell 22. Compressed seal half 24 essentially fills the space or sealing volume defined between outer shell 20 and inner shell 22 such that an essentially continuous sealing interface is created between seal 24 and the interior surfaces of shells 20,22.

Slits 24a are also dimensioned such that seal 24 is radially compressed around axial assembly tabs 20a to create a tight seal therebetween.

Referring now to FIGS. 4 and 5, outer shell portion 20 is shown in more detail. Each half of shell portion 20 includes radial assembly tabs 20b which mate with sockets 20c on an identical, mating half. Shell portion 20 also includes a central, hollow semi-cylindrical stem portion 20d and a coaxial disc-shaped portion 20e with peripheral side wall 20f. Axial assembly tabs 20a are formed as integral projections of the wall of stem portion 20d and include small, beveled locking tabs on their free ends. Semi-cylindrical stem portion 20d and disc portion 20e (with peripheral side wall 20f) define two coaxial, semi-cylindrical portions which mate with seal half 24 described below.

As shown in FIG. 4, two identical halves of outer shell portion 20 can be diametrically and releasably locked together via tabs 20b and sockets 20c to form a cylindrical whole.

Figure 7:
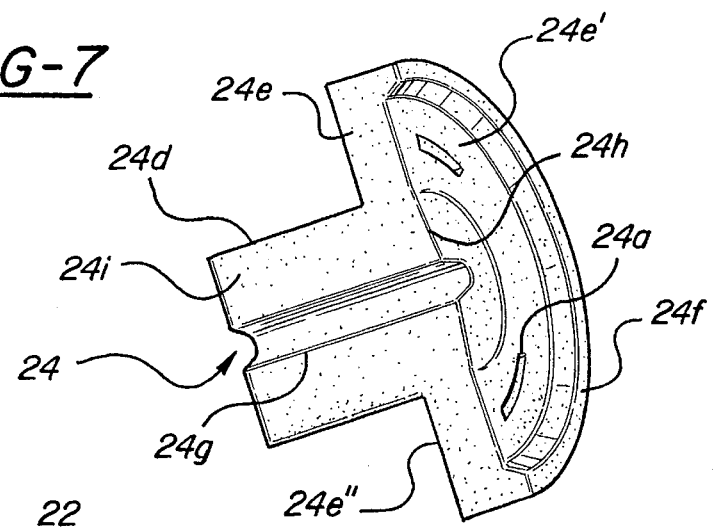
FIG. 7 is a perspective view of a seal half from FIG. 6.

Referring now to FIGS. 6 and 7, seal half 24 is shown comprising a semi-cylindrical stem portion 24d, a radial disc portion 24e with upper and lower opposing faces 24e',24e" and a peripheral side wall 24f, an elongated opening or groove 24g extending the length of stem 24d, and a thickened contour portion 24h around groove 24g. The axial and radial dimensions of semi-cylindrical stem 24d, disc 24e and side wall 24f are slightly greater than the corresponding dimensions of outer shell stem 20d, disc portion 20e and side wall 20f. At the same time, the dimensions of slits 24a are smaller than the dimension of axial assembly tabs 20a. These dimensions ensure that seal 24 mates essentially flush with the inner surfaces of shell portion 20 under an initial radial compression to create an essentially continuous seal therebetween.

Figure 11:
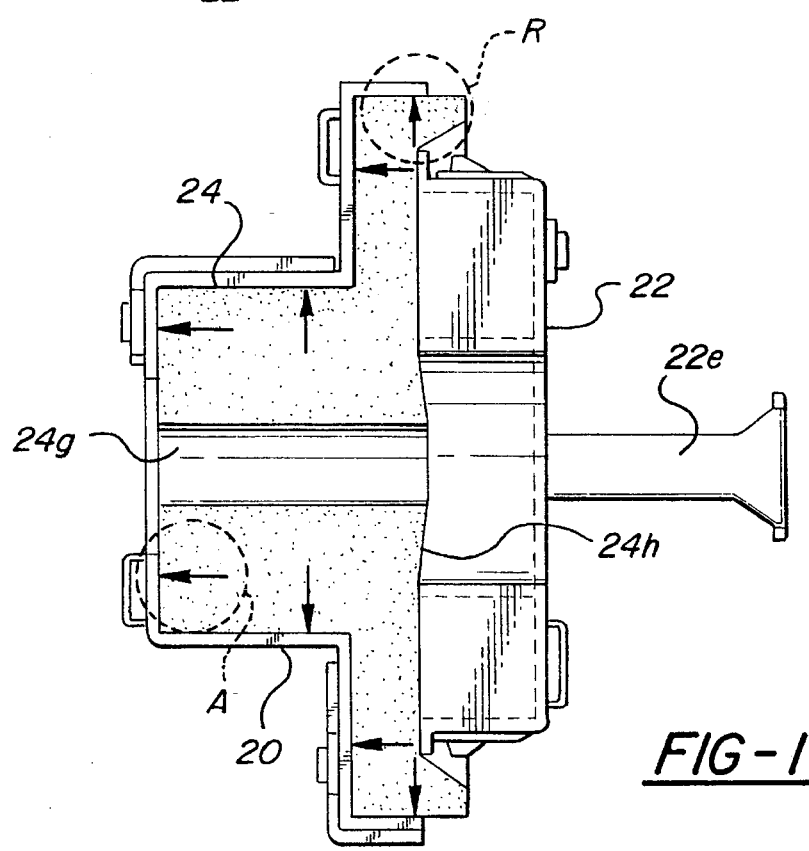
FIG. 11 is a side view of a complete grommet assembly half from FIG. 10.

As best shown in FIGS. 3 and 11, seal halves 24 axially mate with or nest in outer shell portions 20 such that the outer surfaces of disc portion 24e and stem portion 24d (including lower face 24e") seal with the corresponding inner surfaces of outer shell portion 20. Upper face 24e' and peripheral side wall 24f are left exposed for purposes hereinafter described.

Figure 8:
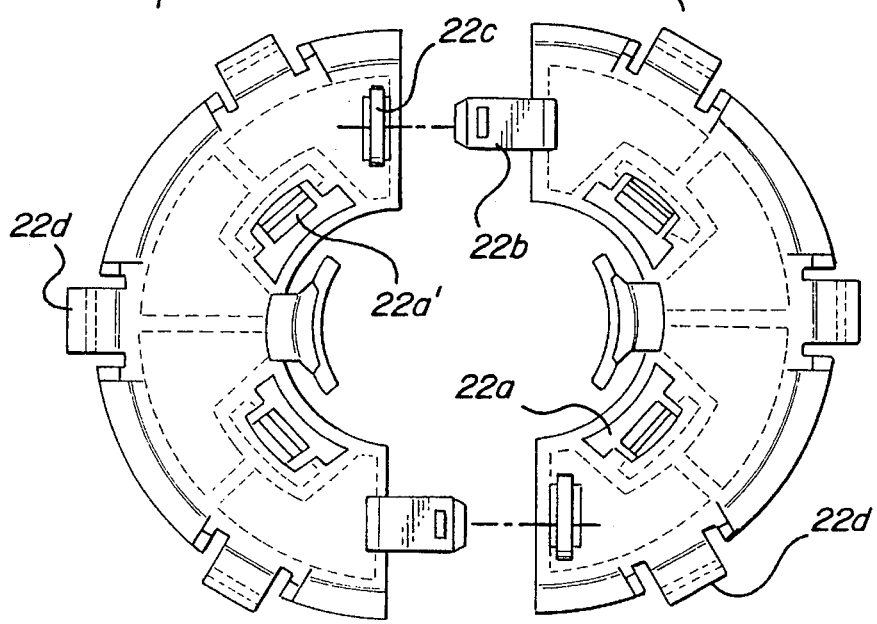
FIG. 8 is a plan view of the inner shells of the grommet assembly of FIG. 1.
Figure 9:
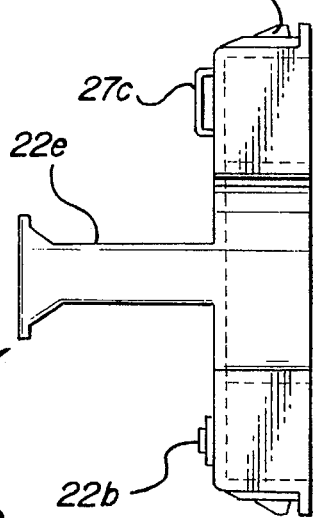
FIG. 9 is a side view of an inner shell from FIG. 8.

Referring now to FIGS. 8 and 9, the details of inner shell portion 22 are shown including axial assembly sockets 22a with internal locking fingers 22a' radial assembly tabs 22b and mating sockets 22c, locking fingers 22d for engaging the dash panel opening in a releasable snap-lock-fit, and a resilient arm 22e which can be taped or otherwise bound to the cable.

Each inner shell portion 22 is axially assembled to previously mated outer shell 20 and seal half 24 as shown in FIG. 3, by guiding sockets 22a and their associated locking finger structure onto the portions of axial assembly tabs 20a projecting from the upper face 24e' of seal half 24. Tabs 20a and locking structure and sockets 22a are axially dimensioned such that the locking connection between shell portion 22 and outer shell 20 occurs only after seal half 24 has been axially compressed therebetween. Inner shell portion 22 is sealed against the upper face 24e' of seal half 24 radially inwardly of the exposed peripheral edge 24f.

As with outer shell portions 20, inner shell portions 22 can be radially locked together into a circular whole via tabs 22b and sockets 22c. Arms 22e can be used to securely "bundle" cable or wire harness 12 and further lock it axially to assembly 10, for example by wrapping with wire, cord or tape T as illustrated in FIG. 1.

Figure 10:
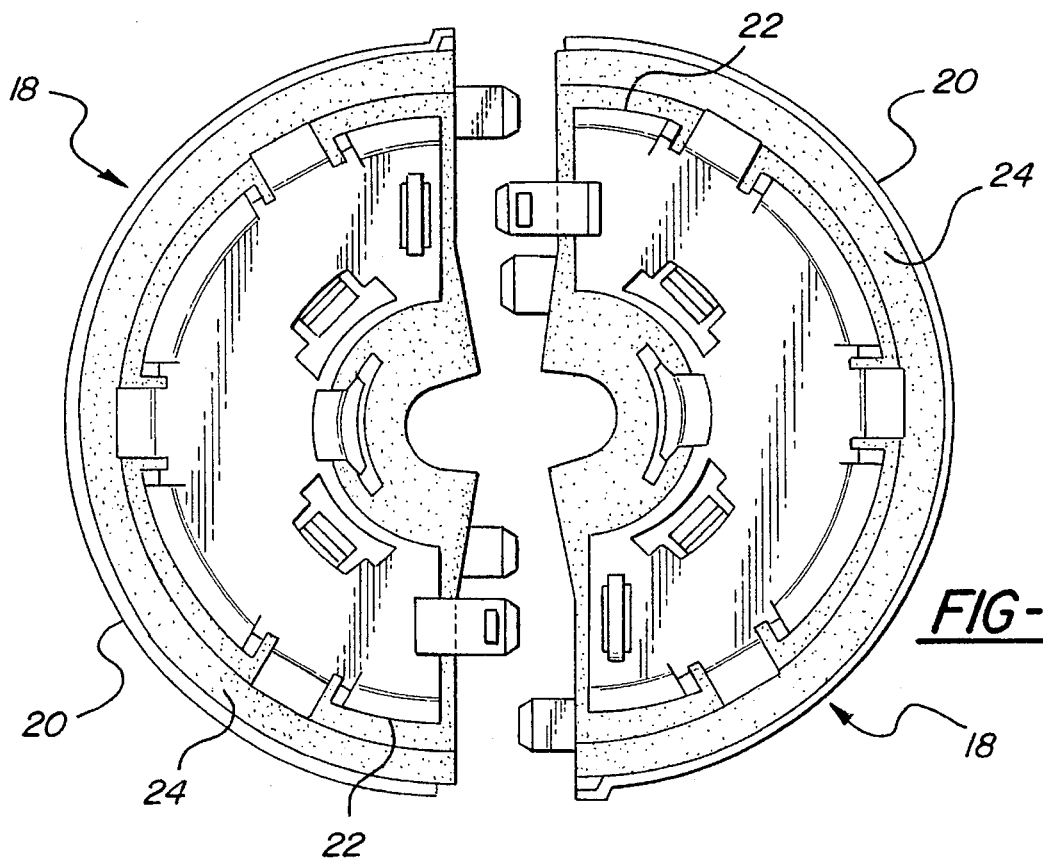
FIG. 10 is a plan view of two complete grommet assembly halves according to FIG. 2.

Referring now to FIG. 10, two complete grommet assembly halves 18 are shown in plan view, each comprising an axially-assembled outer shell portion 20, inner shell portion 22 and seal half 24. The complete grommet halves 18 are diametrically mated via locking tabs 20b,22b and sockets 20c,22c on outer shell portions 20 and inner shell portion 22. It is clear from FIG. 10 that at least the thickened central contour portions 24h on the mating faces of seal halves 24 must first be compressed before grommet halves 18 are diametrically locked together. Accordingly, seal halves 24 are both radially and axially compressed when sandwiched between outer shell 20 and inner shell 22, and are further compressed in the radial direction when grommet halves 18 are fitted together. These compressive forces on seal 24 ensure a secure, tight sealing fit at its interface with the surfaces of outer shell 20 and inner shell 22. This prevents leaks between the assembled portions of grommet assembly 10.

Referring now to FIG. 11, a completed grommet half 18 is shown in side view, highlighting the compressive, sealing fit between seal 24 and shells 20,22. Seal 24 essentially fills the space between assembled shells 20,22, with outer shell portion 20 in sealing contact with the outer surfaces of seal half 24 and inner shell portion 22 in sealing contact with upper face 24e' of seal half 24. The compressive forces between seal 24 and shells 20,22 eliminate leaks or gaps at their interface. Radial compression is illustrated by those arrows parallel to arrow R, while axial compression is illustrated by the arrows parallel to arrow A.

Referring now to FIGS. 12 and 13, the exposed, circumferential sealing edge of grommet assembly 10 is shown in side section as the assembly is inserted into opening 16 and mechanically locked in place. Spring fingers 22d on inner shell 22 yield inwardly when initially inserted in opening 16, then spring outwardly to engage the edge of hole 16 as shown in FIG. 13. Resilient circumferential side wall 24f of seal 24 is simultaneously forced into a compressive sealing engagement with panel 14 to create a tight seal between hole 16 and grommet assembly 10.

Grommet assembly 10 can be released from hole 16 by depressing spring fingers 22d inwardly and withdrawing the assembly from the hole.

Referring now to FIGS. 14–16, the sealing relationship between seal 24 and cable 12 is illustrated.

FIG. 14 illustrates the large sealing interface between seal 24 and cable 12 when the cable is sandwiched between the grooves 24g of FIG. 11. Mated grooves 24g define an elongated seal channel extending the entire length of the mating faces 24i of seal halves 24. The length of the seal channel and the resulting seal interface with cable 12 is substantially greater than the diameter of cable 12 or the seal channel. The resilient nature of the seal material and the length of the seal channel defined by grooves 24g accordingly result in an extraordinarily uniform, secure seal with cable 12 between shells 20,22.

In FIGS. 14 and 15 it can be seen that the diameter of each groove 24g increases from a minimum at its base to a maximum at the mating face of seal half 24, flaring outwardly toward thickened contour portions 24h. The nominal base diameter of each groove 24g is less than the expected diameter of cable 12 to ensure a tight sealing fit therebetween. Because the diameter of groove 24g is not constant, but decreases from the mating face 24i toward the circumferential edge of seal half 24, groove 24g can accommodate a wide variety of cable diameters in resilient sealing fashion as best shown in FIG. 14. The relaxed nominal diameter of groove 24g is illustrated in phantom, less than the diameter of cable 12 to which it resiliently conforms as shown in solid lines.

In FIGS. 15 and 16, radially thickened and outwardly angled contour portions 24h are compressed when seal halves 24 are mated, forcing grooves 24g to conform closely to cable 12 and eliminating any gaps between the normally non-circular contours of the grooves and the essentially circular cable 12. In this manner the user need not be concerned if the diameter or concentricity of cable 12 varies from the standard, since the variable diameter of grooves 24g and the radial compression effected by thickened portions 24h ensure a uniform, tight seal around cable 12.

The compression of seal contour portions 24h additionally increases the overall radial compression of seal 24 between shells 20,22.

In general, then, grommet assembly 10 according to the present invention reduces manufacturing costs, is easy to assemble to both the cable 12 and panel 14, and provides large, secure sealing interfaces between its own components, with cable 12, and with panel 14.

While the foregoing description of an illustrative embodiment of the invention is described in accordance with 35 U.S.C. §112, it will be apparent to those skilled in the art that many variations and modifications to the structure of the illustrated embodiment can be made without departing from the scope of the invention as set forth in the appended claims.

I claim:

1. A grommet assembly for sealing a wire harness or cable to a panel, for example an automotive dash panel, comprising:

two separate, radially-mating grommet halves, each half comprising a compressible seal half and two substantially rigid shell halves, the seal half and the shell halves axially assembled with the seal half compressively sandwiched between the shell halves, the seal half both axially and radially compressed by the shell halves in the assembled condition, each seal half including an elongated groove opening onto a radially-mating face of the seal half, such that when the grommet halves are assembled the grooves define an elongated seal channel which sealingly engages the cable, the grooves which define the seal channel flaring outwardly toward the face of each seal half.

2. Apparatus as defined in claim 1, wherein each groove is bordered by a radially thickened contour portion on the radially mating face of the seal half.

3. A grommet assembly for sealing a wire harness or cable to a panel, for example an automotive dash panel, comprising:

two separate, radially-mating grommet halves, each half comprising a compressible seal half and two substantially rigid shell halves, the seal half and the shell halves axially assembled with the seal half compressively sandwiched between the shell halves, the seal half both axially and radially compressed by the shell halves in the assembled condition, each seal half being rotationally locked to a first one of said shell halves by at least one assembly tab extending through an opening in the seal half when the seal half and the first shell half are axially assembled.

4. Apparatus as defined in claim 3, wherein the seal half opening is radially compressed by the axial assembly tab for sealing engagement therewith.

5. A grommet assembly for sealing a wire harness or cable to a panel, for example an automotive dash panel, comprising:

a first shell for axial connection to an opening in the panel, the first shell comprising two essentially semi-circular shell halves;

a second shell axially assembled to the first shell, the second shell comprising two essentially semi-circular shell halves; and a resilient seal comprising two essentially semi-circular seal halves, the seal having an axial sealing passage for accepting a cable therethrough, the seal sandwiched between and both axially and radially compressed by the shells in the assembled condition, the grommet assembly comprising two essentially semi-circular grommet halves for diametrical assembly to a cable prior to axial assembly of the first shell to a panel, each grommet half comprising one of the first shell halves, one of the second shell halves, and one of the seal halves compressively sandwiched therebetween, each said resilient seal half including an elongated groove on a diametrically mating surface to define a seal channel when the halves are mated, the seal halves further including radially thickened portions along the grooves which must be compressed before the grommet halves will radially mate.

6. A grommet assembly for sealing a wire harness or cable to a panel, for example an automotive dash panel, comprising:

two separate, diametrically-mating grommet halves, each half comprising an outer shell half, an inner shell half axially connected to the outer shell half to define a sealing volume therebetween, and a compressible seal half whose axial and radial dimensions are greater than the dimensions of the sealing volume between the outer and inner shell halves, such that the seal half essentially fills the sealing volume under axial and radial compression to provide a continuous sealing interface with the outer and inner shell halves in the assembled condition, the seal half comprising a stem portion and a radial flange portion of greater diameter than the stem portion, the radial flange portion having opposed upper and lower faces and a peripheral edge, the seal half axially nesting within the outer shell half under an initial radial compression, and the inner shell half mating with the outer shell half in sealing contact with the upper face of the seal half radially inward from the peripheral edge to place the seal half under axial compression.

7. Apparatus as defined in claim 6, wherein the seal half in each of the assembled grommet halves defines a diametrically mating face at least a portion of which must be radially compressed before the grommet halves can be diametrically mated.

8. Apparatus as defined in claim 7, wherein the mating face of each seal half includes an axial groove extending the length of the radially mating face, the grooves of two assembled grommet halves defining an elongated seal channel for engaging the cable.

9. A grommet assembly for sealing a wire harness or cable to a panel, for example an automotive dash panel, comprising:

two separate, diametrically-mating grommet halves, each half comprising an outer shell half, an inner shell half axially connected to the outer shell half to define a sealing volume therebetween, and a compressible seal half whose axial and radial dimensions are greater than the dimensions of the sealing volume between the outer and inner shell half, such that the seal half essentially fills the sealing volume under axial and radial compression to provide a continuous sealing interface with the outer and inner shell halves in the assembled condition, the seal halves defining a circumferential seal portion projecting from the sealing volume in the grommet assembled condition to be sealingly engaged to the panel when the grommet assembly is inserted therein.

10. A grommet assembly comprising:

a body of compliant sealing material having integral, coaxial cylindrical and disc portions arranged along and around an axis of symmetry, the disc portion being of substantially greater diameter than the cylindrical portion and having first and second opposed faces, the body of compliant sealing material being diametrically divided into two essentially mirror image seal halves having resilient mating faces which, when diametrically mated, define an axial opening which accommodates a wire harness or cable;

a first rigid shell half which partially surrounds the outer surfaces of the cylindrical and disc portions and one opposing face of the disc portion of the seal half, the first shell half having at least one connector tab extending axially through the disc portion of the seal half;

a second rigid shell half which axially receives and connects to the connector tab to join the first and second shell halves with the seal half compressed therebetween to define a grommet half, the second shell half abutting the second opposing face of the disc portion of the seal half in a manner leaving a peripheral portion of the second opposing face exposed to act as a seal; and diametric connector means on at least one pair of the first and second shell halves for joining one grommet half to another to clamp a cable or wiring harness therebetween.

11. A grommet assembly for sealing a wire harness or cable to a panel, for example an automotive dash panel, comprising:

two separate, radially-mating grommet halves, each half comprising a compressible seal half and first and second substantially rigid shell halves, the seal half and the shell halves axially assembled via a connector on one of the shell halves extending through the seal half and engaging the other shell half, the seal half being compressively sandwiched between the shell halves to provide a sealing fit between the seal half and the shell halves, the seal half further including a mating face which is further compressed upon diametrical assembly of one grommet half to another grommet half over a cable.

12. Apparatus as defined in claim 11, wherein the seal half includes an integral circumferential sealing portion located about the circumference of a first shell half to be connected to a panel such that the circumferential sealing portions of the grommet assembly form a continuous compressive sealing fit with the panel when the grommet assembly is connected to the panel.

* * * * *